United States Patent [19]

McClary et al.

[11] Patent Number: 4,774,686
[45] Date of Patent: Sep. 27, 1988

[54] SERIAL DIGITAL SIGNAL PROCESSING CIRCUITRY

[75] Inventors: Dennis R. McClary, East Windsor Twp., Mercer County; Charles B. Dieterich, South Brunswick Twp., Middlesex County, both of N.J.

[73] Assignee: RCA Licensing Corporation, Princeton, N.J.

[21] Appl. No.: 842,653

[22] Filed: Mar. 21, 1986

[51] Int. Cl.$^4$ .......................... G06F 7/38; G06F 7/52; G06F 7/50
[52] U.S. Cl. .................................. 364/736; 364/754; 364/785; 364/769
[58] Field of Search ................ 364/736, 754, 784–785, 364/768–769; 340/146.2

[56] References Cited

U.S. PATENT DOCUMENTS 3,822,378  7/1974  Kashio ................................ 364/785
4,285,047  8/1981  Ohnishi ............................... 364/785

OTHER PUBLICATIONS

Hans W. Gschwind, Design of Digital Computers, Springer–Verlag, New York, 1967, pp. 134–159.
"An Approach to the Implementation of Digital Filters" by Jackson, et al., IEEE Transactions on Audio & Electroacoustics vol. AU–16, No. 3, 9/68 pp. 413–421.
"A Voiceband Codec with Digital Filtering" by Candy, et al. IEEE Transactions on Communications, vol. Com–29, No. 6, 6/81, pp. 815–830.

*Primary Examiner*—Gary V. Harkcom
*Assistant Examiner*—Long Thanh Nguyen
*Attorney, Agent, or Firm*—Eugene M. Whitacre; Paul J. Rasmussen; Eric P. Herrmann

[57] ABSTRACT

A serial-bit digital processing system uses registers and latches to synchronize samples and justify sign-bits. Nominally each processing block in the system includes a sign extend register preceding an arithmetic element and an output register following the arithmetic element. Input registers of one arithmetic element may merge with output registers of the preceding arithmetic element. Ones of the registers include a serially coupled latch which is selectively controlled to pass serial sample bits or to replicate the sign bit. The respective registers are clocked with one of two clock signals having different numbers of pulses per sample period and the length of the respective registers are selected so that at the terminus of each sample period the bits of each sample in the processing system are appropriately justified.

20 Claims, 5 Drawing Sheets

SERIAL DIGITAL SIGNAL PROCESSING CIRCUITRY

This invention relates to circuitry for processing digital signals occurring as serial multi-bit words or samples.

Recent advances in integrated circuit technology have fostered a trend toward converting many analog signal processing systems to digital signal processing systems. The impetus for this trend is greater system reliability, fewer system parts and the potential for simplified automated assembly and parametric adjustments. Specific examples are digital television receivers and audio compact disc players.

There are in general two types of digital processing systems, serial-bit and parallel-bit. The parallel-bit systems are capable of processing signals of greater bandwidth but require more hardware while serial-bit systems are generally simpler but are signal bandwidth limited (at least for economical consumer applications). For the current state of the art of digital signal processing, the bandwidth of video signals require that digital video systems be realized in parallel-bit tecnhology. However, the bandwith of audio signals, for example, is sufficiently narrow to permit serial-bit digital processing.

Serial digital signals are multi-bit binary samples with respective bits of a given sample occurring sequentially in time, the least significant bit (LSB) occurring first and the most significant bit (MSB) or sign bit occurring last. A sample is a binary number representing a signal amplitude. In a digital serial-bit processing system, the samples are processed arithmetically. Signal amplification or attenuation corresponds to sample multiplication and division respectively. Multiplication by powers of two increases the number of bits in the corresponding sample by one bit for each power of two and division essentially reduces the number of bits in the sample. The product of two N-bit samples is a 2N-bit sample. The sum or difference of two N-bit samples is an (N+1)-bit sample.

Typically in a serial-bit digital processing system, samples are sequentially subjected to different ones of the foreoing mathematical functions. Consequently, the number of bits of the processed samples increase and/or decrease. It will readily be appreciated, that since the sample bits occur sequentially, the change in sample bit width creates significant timing difficulties for the system designer. For example, addition requires a particular number of clock pulses per sample operation and multiplication a different number of clock pulses per sample operation.

It is an object of the present invention to provide apparatus for simplifying the design of serial-bit digital signal processing systems.

SUMMARY OF THE INVENTION

This invention relates to a frame oriented serial-bit digital signal processing system wherein a frame defines the period between two successive N-bit serial samples. Functional elements within the system include a serial register for receiving and outputting the sequential bits of each sample applied thereto in the order of LSB first and MSB last. A latch is serially coupled to the output of the serial register. The serial bits are sequentially passed through the latch in a manner to appropriate justify each sample. The sign bit, upon entering the latch, is retained in the latch to replicate the sign bit state for the remained of the respective frame interval. The register and sign bit extension apparatus provide a means to absorb varying sample bit-widths in a processing chain with standardized clocking and control signals.

DETAILED DESCRIPTION

Figure 1:
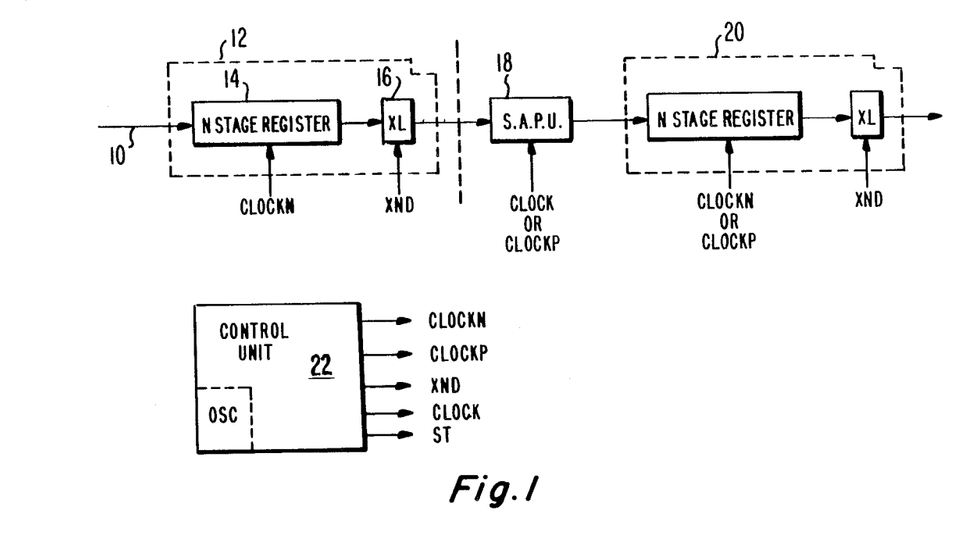
FIG. 1 is a block diagram of a serial-bit digital processing element including sign-extend registers embodying the present invention.
Figure 2:
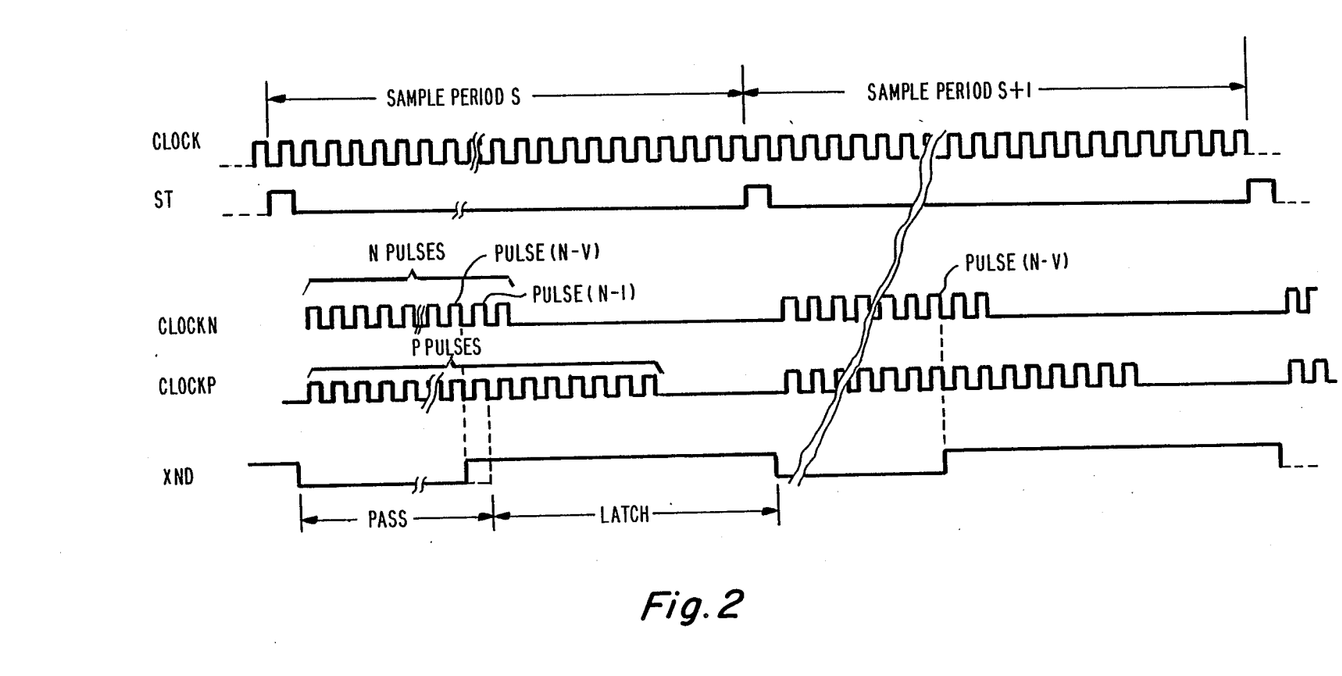
FIG. 2 is a clock timing-waveform diagram illustrating system timing for serial processors incorporating the invention.

The apparatus of FIG. 1 illustrates the basic embodiments of the invention which will be described with the aid of the clock waveforms illustrated in FIG. 2. In FIG. 1, serial digital samples to be processed are applied at terminal 10. These samples occur at a sample rate defined by the waveform ST in FIG. 2 with the sample bit rate defined by the waveform CLOCK. The number of bits per sample may be N, but in general the resolution of the sample may be less than N-bits. In other words, although each sample may contain N bits, the maximum possible signal sample value may represented by $(N-V)$-bits. N and V are both integers but the value of V may vary throughout a system because the maximum possible values of the processed samples may increase or decrease and therefore the number of bits required to define the sample value will increase or decrease. For example, if the number of bits, N, of a sample is 20, but the maximum possible sample value is 255 which may be represented with 8 bits, then V equals 12. If this sample is doubled, the doubled sample value is 510 which requires 9 bits. In this instance, the value of V can be no greater than 11.

The $N-V$ information bits of each serial sample occur, seriatim, from least significant bit (LSB) to most significant bit (MSB). The extra V bits are appended to the MSB end of each sample to absorb changing bit widths of processed samples. The samples are presumed to be in two's complement format with the $(N-V)^{th}$ bit representing the sign bit. In order to efficiently process two's complement samples, the sign bit is traditionally constrained to occupy the MSB portion of each respective sample. This condition is achieved in the present invention by replicating the $(N-V)^{th}$ sign bit in the V subsequent bit positions. An N-bit sample having V extra MSB's replicating the $(N-V)^{th}$ sign bit of a sample with $(N-V)$ bit resolution has the same numeric value as an $(N-V)$ bit sample.

Referring again to FIG. 1 assume that an $(N-V)$ bit two's complement sample is applied to terminal 10. This sample is synchronously clocked into the N-stage serial shift register 14 under the control of the clock signal CLOCK N having N clocking pulses. The first clock pulse is synchronized to occur coincidently with the first or least significant sample bit. The sample bits are clocked into the $N-V$ least significant bit positions of register 14, that is into the register stages closest to the register output connection. The information loaded into the V more significant positions of the register (the register stages nearest the input connection) may be one or zeroes, their values being immaterial. At the end of the $N^{th}$ clock pulse of CLOCK N, CLOCK N is halted and the sample is stored in the register until the next sample period. In this example, so far, the sign bit has not been replicated into the V-MSB's of the register (or the sample).

For the present ignore element 16 and assume that during the next sample period CLOCK N is again energized for N clock periods and the sample contained in register 14 is coupled bit seriatim to the serial arithmetic processing unit SAPU 18. Assume also that SAPU 18 is designed to add a constant represented by more than $N-V$ bits to the current sample. If the signal bit of the current sample is not replicated, an error may result. For example, assume that a two's complement representation of the value eight (01000) is to be added to the current sample. Assume further that N is equal to five, $(N-V)$ is equal to four and the current sample value is minus one and that the V MSB's of the current sample are zero. As defined, the current sample is represented by (01111). The result of adding (01000) to (01111) produces the erroneous result of (10111) or minus nine in two's complement. Alternatively, if the sign bit of the current sample (second bit from the left of the value 01111) is replicated in the MSB, the current sample becomes (11111). When this value is added to (01000) the correct result of (00111) is produced.

Sign bit replication is accomplished by connecting a sign extension latch, 16, serially to the output terminal of register 14. Latch 16 is conditioned by a control signal XND to pass the first $N-V-1$ sample bits output by register 14 and to latch and hold the $(N-V)^{th}$ sample bit (the sign bit) for the remainder of the sample period. Latch 16 may be of the type designated SN74LS75 "Bistable Latches" available from Texas Instruments, Inc., Dallas, Tex. The timing of the control signal XND applied to latch 16 relative to the clock pulses provided by CLOCK N is illustrated in FIG. 2.

In this example, since latch 16 holds the $(N-V)^{th}$ sample bit for the remainder of the sample period, it will be readily appreciated that the values stored in the V MSB positions of register 12 are immaterial. Note, however, that if the sign bit of the $(N-V)$ bit sample in register 14 has been replicated in the V MSB positions then the onset of the control signal may be delayed to the $(N-1)$st clock pulse of CLOCK N. In this instance the number of bits defining the sample resolution may change to greater or lesser numbers but the leading edge of the control pulse XND can be held constant at clock pulse $(N-1)$.

Nominally, the positive going transition of the signal XND will be generated to occur immediately after the clock pulse corresponding to the most significant value bit position of the sample having the least number of value bits in a given sample. To accommodate samples defined with a greater number of bits processed by similar circuits in the system, the positive going transition of signal XND is delayed by the appropriate number of clock periods by, for example, flip-flop stages.

The combination of the register 14 and latch 16 will subsequently be designated a sign-extend-shift-register, SXSR.

The output of the SAPU 18 is coupled to a further SXSR 20. The SAPU 18 in general will not contain sample storage so SXSR 20 is provided to accept the sample bits as they are processed and to store the processed bits until the next sample period. If the SAPU 18 processes samples without delay, that is the processing of a respective bit is completed within its corresponding clock period, SXSR 20 will be clocked by CLOCK N. Alternatively if the processed bits incur bit-time delays in being processed in SAPU 18, SXSR 20 must be clocked by more than N pulses to properly right justify the sample bits in the register for the next sample period.

Consider that the sample bits incur a delay of M clock pulse periods in being processed in SAPU 18. In order for the LSB of the processed sample to be registered in the LSB position of the N stage SXSR 20 upon completion of processing the respective sample, SXSR 20 must be clocked with $N+M$ clock pulses. In FIGS. 1 and 2 CLOCK P provides the appropriate numbers of pulses.

In general, CLOCK P provides a number of pulses per sample period to accommodate the particular SAPU in the system, which has the greatest processing delay. Additional register stages are coupled between other SAPU's (having lesser processing delays) and their corresponding SXSR's so that a common clock signal CLOCK P may be utilized for at least a majority of processing circuits having processing delays. The number of additional register stages are selected so that the processing delay (in clock pulse periods) plus the additional stages plus N equals the number P.

The apparatus in FIG. 1 includes an SXSR at the input and output of the processing element 18. In general, SXSR 12 will be associated with a preceding processing stage and it is not intended to be implied that an arithmetic processing element embodying the present invention requires both an input and an output SXSR. In fact, certain processing functions may be serially chained together without intervening SXSR's.

The system clocks and/or control signals are generated in the control unit 22. Control unit 22 may include an oscillator from which the master clock, CLOCK, is derived. CLOCK N, CLOCK P, sample signal ST and the sign extend control signal XND may all be derived from the master clock signal by conventional counting and gating circuits. One skilled in the art of digital signal processing will readily be able to generate such signals knowning the relationships illustrated in FIG. 2.

Figure 3:
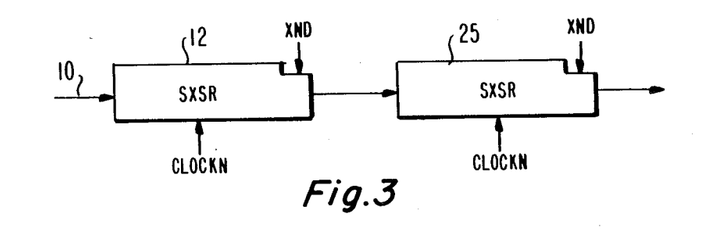
FIGS. 3, 4, 5, 6, 7, and 8 are block diagrams of serial arithmetic processing elements incorporating the present invention.

FIG. 3 illustrates circuitry to multiply a serial sample by a constant value equal to $2^{-(P-N)}$. Shifting all the bits of a sample to one bit position of lesser significance effects a multiplication of the sample by a factor of $\frac{1}{2}$. Shifting all the bits of a sample to N-bit positions of lesser significance effects a scaling or multiplication by $2^{-N}$ and shifting the bits to $(P-N)$ bit positions of lesser significance effects a multiplication by $2^{-(P-N)}$. Assume that at the beginning of a sample period register 12 contains an N-bit sample. Assume also that SXSR registers 12 and 25 have equal numbers of stages. SXSR 12 is clocked by CLOCK N and SXSR 25 is clocked by CLOCK P with $P>N$. After N clock pulses the sample in SXSR 12 has been transferred into SXSR 25. However, CLOCK P continues to run clocking the sample further through SXSR 25. $P-N$ sample bits are lost off the right end of SXSR 25. At the end of the burst of CLOCK P pulses, the $2N-P$ more significant bits of the original N-bit sample occupy the $2N-P$ LSB positions of register 25. The $P-N$ MSB positions of register 25 are loaded with the replicated sign-bit of the sample from register 12. The value of the sample in register 25 is $2^{-(P-N)}$ times the value of the original N-bit sample due to the change in bit significance. Note that the sign extend latch of register 25 is energized after N−1 clock pulses to replicate the sign bit of the stored sample. Replicating the sign bit in register 25 occurs during the time that the P−N bits from register 12 are clocked out of register 12 to perform the multiplication. For practical implementations of this circuit the number of clock pulses of clock P minus the number of clock pulses of CLOCK N must be less than the number of bits defining the resolution of the original samples or else the shifted samples will be rendered equal to a value of zero.

Figure 4:
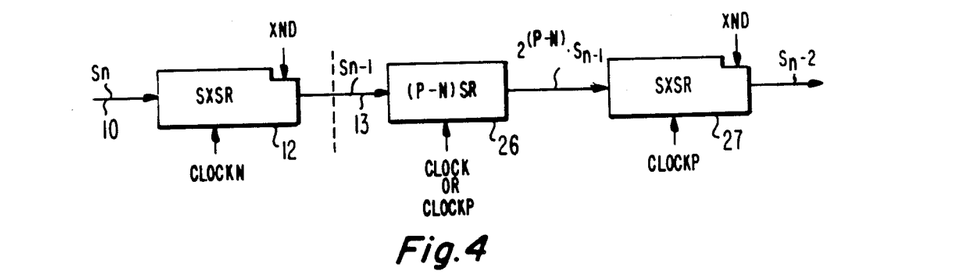

FIG. 4 is one embodiment of a stage for delaying a sample by one sample period. The circuit consists of the cascade connection of an SXSR 12, a (P−N)-stage shift register 26 and SXSR 27. The value (P−N) is equal to the difference in the number of pulses between CLOCK P and CLOCK N. The number of stages in each of registers 12 and 27 are assumed to be N. The number of stages in the combined registers 26 and 27 is equal to (P−N)+N or P stages. Consequently, P clock pulses are required to clock the LSB from SXSR 12 into the LSB position of SXSR 27. This is precisely the number of pulses occurring in a burst of CLOCK P pulses in each sample period. Thus, registers 26 and 27 provide a delay of one sample period if they are clocked by CLOCK P. It will be readily appreciated by one skilled in the art of serial digital processing that register 26 may be clocked continuously by the master clock, CLOCK. It will also be appreciated that an N-stage SXSR substituted for registers 26 and 27 and clocked by CLOCK N will effect a one sample period delay for a serial sample.

Next consider that registers 26 and 27 are clocked by CLOCK N. In this instance, at the end of the CLOCK N pulse train the LSB of the sample from SXSR 12 will be in the (P−N)th LSB position of register 27. Essentially, all of the bits of the sample have been shifted to (P−N) more significant bit positions. This shift in bit position sigificance is equivalent to a multiplication of the sample by $2^{(P-N)}$. Thus, multiplication by multiples of two may be performed by interposing register stages in the signal processing path and division by multiples of two may be performed by adding clock pulses to, for example, the clock signal of a register.

Figure 5:
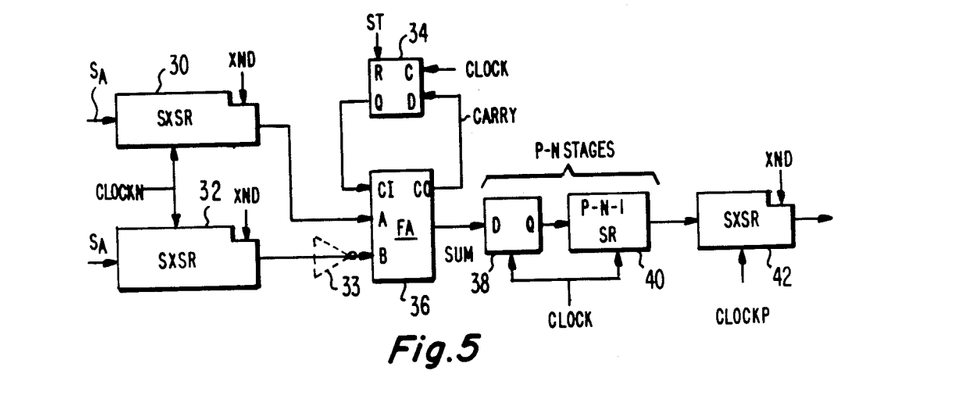

FIG. 5 illustrates circuitry for summing two serial samples. The signals to be summed (SA and SB) are shown provided by SXSR's 30 and 32 respectively. The samples SA from SXSR 30 and samples SB from SXSR 32 are coupled to the augend/addend input terminals A and B of a full adder 36. Adder 36 may be of the type designated SN74H183 and sold by Texas Instrument Inc., Dallas, Tex. The sum output bits provided by adder 36 are coupled to the "D" type flip-flop 38. Flip-flop 38 is serially interposed in the sum signal path to afford the adder 36 a full bit time to perform each bit sum while providing stable sum bits to subsequent circuit elements.

The carry-out bit from adder 36 is delayed one clock period in the "D" type flip-flop 34 and coupled to the carry-in input terminal CI of adder 36. Flip-flop 34 provides the carry from the sum of each pair of addend/augend sample bits for addition to the sum of the next more significant pair of addend/augend sample bits. Flip-flop 34 is nominally reset to a zero at the beginning of each sample period by the signal ST.

The sum output available from flip-flop 38 is delayed one clock period relative to the input samples. If the output of flip-flop 38 is coupled to the standard N-stage SXSR register clocked by CLOCK N the samples will be multiplied by the factor 2 because of the extra one-bit delay. In order to store the sample sum of the duration of the sample period and to normalize the sums, the output of flip-flop 38 is coupled to the cascade connection of a (P−N−1) stage register 40 and an N-stage register 42. Flip-flop 38 and register 40 combine to form a register, which when coupled with SXSR 42, functions similar to registers 26 and 27 in FIG. 4. Clocking flip-flop 38 and register 40 with the signal CLOCK and clocking SXSR 42 with CLOCK P results in each sample sum being appropriately justified in register 42 at the end of each sample period.

Figure 6:
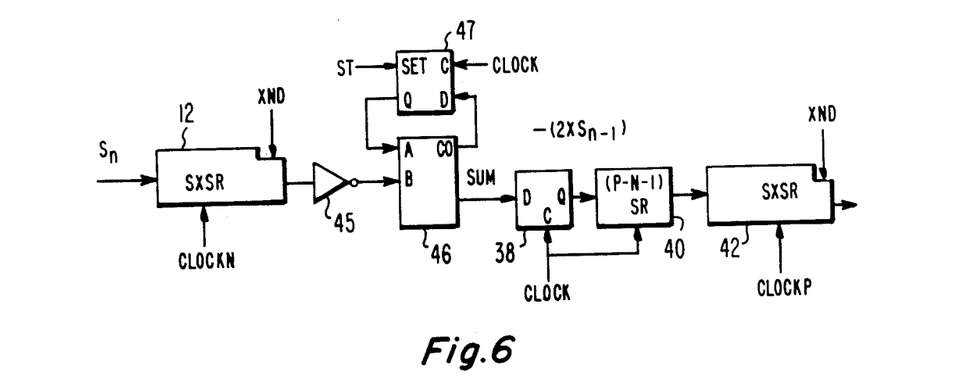

FIG. 6 illustrates a two's complement circuit. Two's complementing is performed by inverting (complementing) the sample bits and adding one unit, that is incrementing the value of the complemented sample by the least significant bit unit value. In FIG. 6, the sample bits are inverted in inverter 45 and coupled to a standard half-adder 46, such as is illustrated at page 135 of Design of Digital Computers by Hans W. Gschwind (Springer-Verlag, New York, 1967). The output of half-adder 46 is coupled to "D" type flip-flop 38 and the cascade connection of register 40 and SXSR 42 which function in like fashion to the similar combination in FIG. 5.

The carry-out, Co, from half-adder 46 is delayed one clock period in D type flip-flop 47 and coupled back to one of the addend/augend input terminals, (A) of the half adder. Flip-flop 47 is set to a one value at the beginning of each sample period by the signal ST. This insures that a one is added to the LSB of the complemented sample to form the two's complement.

The principles of operation of the FIG. 6 circuitry may be applied to the circuitry of FIG. 5 to form a substracter circuit. This is accomplished by inserting an inverter 33 serially in one of the addend/augend input paths and setting the flip-flop 34 at the beginning of the sample period (rather than resetting the flip-flop as for the adder operations).

Figure 7:
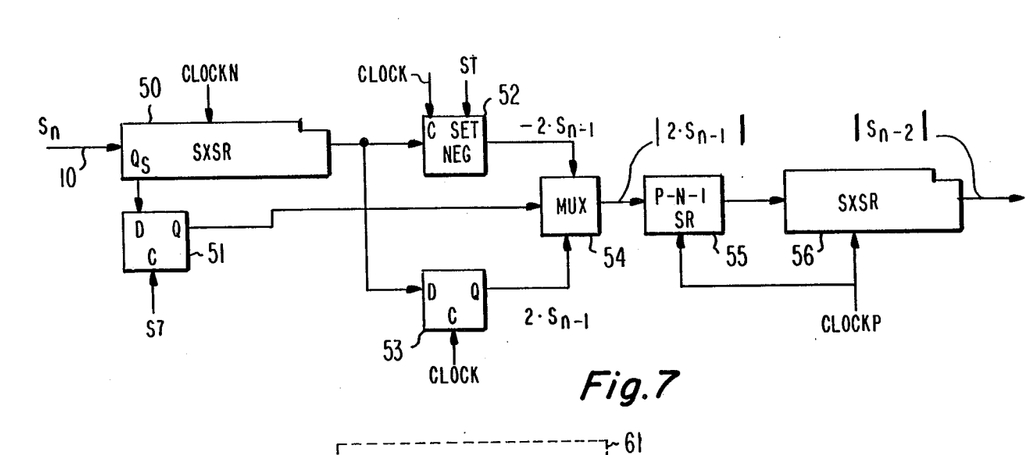

FIG. 7 illustrates an absolute value circuit employing sign-extend registers. The absolute value is formed by two's complementing all samples and applying the samples and their respective complements to 2:1 multiplexer. The sign bit of the sample being processed conditions the multiplexer to pass the sample if positive, and to pass the two's complement of the sample if negative. In FIG. 7, the two's complement circuit is designated block 52 and incorporates a combination of elements such as elements 45, 46, 37 and 38 in FIG. 6. The output of the two's complement block 52 is coupled to one data input terminal of multiplexer 54. The samples, delayed by flip-flop 53 to compensate for the inherent delay in the two's complement circuit 52, are applied to a second data input terminal of multiplexer 54. The output of multiplexer 54 is coupled to registers 55 and 56 which are clocked by CLOCK P. Since the multiplexer is controlled by the sign bit of the respective sample and since the sign bit occurs after the bits representing the sample value, provision must be made to make the sign bit available at the beginning and throughout the sample period. In the FIG. 7 arrangement, this is accomplished by tapping the SXSR 50 at the sign bit position, Qs, and storing its value in the "D" type flip-flop 51 under the control of signal ST. The sign bit for a particular sample is applied by flip-flop 51 to the control input of multiplexer 54 for the entire sample period.

Figure 8:
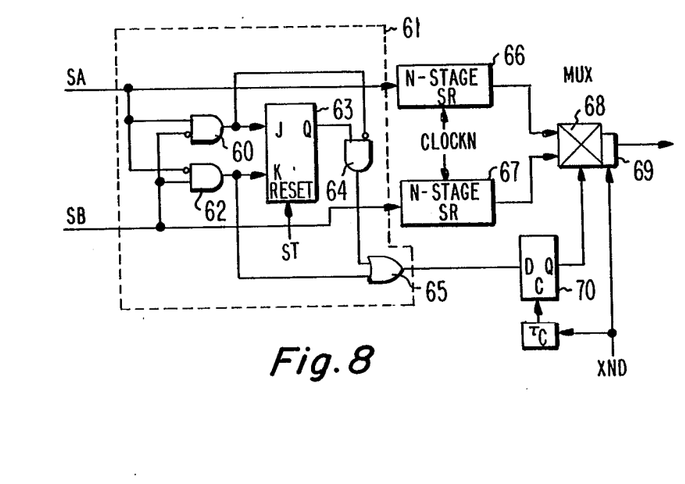

FIG. 8 illustrates a comparator/maximum value circuit which outputs the greater of two samples SA or SB. The two samples SA and SB are serially loaded bit-by-bit into the N-stage registers 66 and 67 respectively, where they are held until the comparison of all the sample bits is completed by comparator 61. The outputs from registers 66 and 67 are coupled to respective data input terminals of multiplexer 68 which is conditioned by the output of comparator 61 to pass the greater of the two samples. A single sign extend latch, 69, is serially coupled to the output of multiplexer 68 in lieu of attaching a sign extend latch to each of the registers 66 and 67.

Comparator 61 operates as follows. Sample SA is serially applied to the non-inverting input of AND gate 60 and to the inverting input of AND gate 62. Sample SB is serially coupled to the inverting input of AND gate 60 and the non-inverting input of AND gate 62. The output terminals of AND gates 60 and 62 are respectively connected to the J and K input terminals of JK flip-flop 63. AND gates 60 and 62 both exhibit logic zero output states if concurrent bits of SA and SB exhibit the same state. AND gate 60 exhibits a logic one output state only when a bit of sample SA is greater than the correponding bit of sample SB. AND gate 62 exhibits a logic one output state only when a bit of sample SB is greater than the corresponding bit of sample SA. At the beginning of a sample period JK flip-flop 63 is reset so that its output, Q, exhibits a logic zero. When the J and K inputs are 1 and 0 respectively, JK flip-flop 63 will produce a logic one output. Conversely, when the J and K inputs are 0 and 1 respectively, it produces a logic zero output. As samples SA and SB are serially applied to AND gates 60 and 62 and corresponding bits have equal values, both AND gates 60 and 62 exhibit logic zero outputs and JK flip-flop 63 retains the output state determined by the previous (SA, SB) bits. Thus, JK flip-flop 63 outputs a logic zero until AND gate 60 exhibits a logic one. This happens for the first occurrence of SA and SB bits being 1 and 0 respectively at which time the output of JK flip-flop 63 is set to a logic one, indicating that sample SA, at least for the number of bits tested, is greater than sample SB. The flip-flop retains this state until an occurrence of corresponding bits of SA and SB having 0 and 1 states respectively indicating that sample SB is greater than sample SA. The sample having the most significant logic one, of all of the corresponding unequal pairs of sample bits, determines the output state of flip-flop 63 after all of the value bits of the two samples are serially applied to the comparator.

Provision must be made for polarity differences of two's complement samples since regardless of the value of the value bits, positive numbers are always greater than negative numbers. The condition of SA and SB being of opposite polarity is indicated by the output state of AND gates 60 and 62 when the sample signal bits occur at their inputs. At the occurrence of the sign bits, AND gate 60 exhibits a logic one output state, if sample SA is negative and sample SB is positive. AND gate 62 exhibits a logic one output state if sample SA is positive and sample SB is negative. AND gates 60 and 62 both exhibit logic zeros if samples SA and SB are either both positive or both negative.

It can be shown that for any combination of polarities of samples SA and SB, ORing the output of AND gate 62 with the output of JK flip-flop 63 ANDed with the complement of AND gate 60 will generate a control signal having a logic one state for sample SA greater than sample SB and a logic zero state for sample SB greater than sample SA. In order to generate this control signal, the output of Jk flip-flop 63 is coupled to the non-inverting input of AND gate 64 and the output of AND gate 60 is coupled to the inverting input of AND gate 64. The output terminals of AND gates 64 and 62 are coupled to respective input terminals of OR gate 65, the output of which is coupled to the data input terminal of "D" type latch 70. The control signal is loaded into latch 70 after the occurrence of the sign bits and stored for an interval equal to a sample period. The control signal stored in latch 70 is coupled to the control input of multiplexer 68. The control signal may be loaded into latch 70 by the signal XND delayed by, for example, one clock period $\tau_c$. Control signals generated during each sample period are used to control the multiplexer during the subsequent sample period.

FIG. 1 and FIGS. 3–8 respectively illustrate a sign-extend register for serial digital signal processing and combinations of sign-extend registers with, for example, arithmetic processing devices to form serial digital processing building blocks.

Figures 9A, 9B:
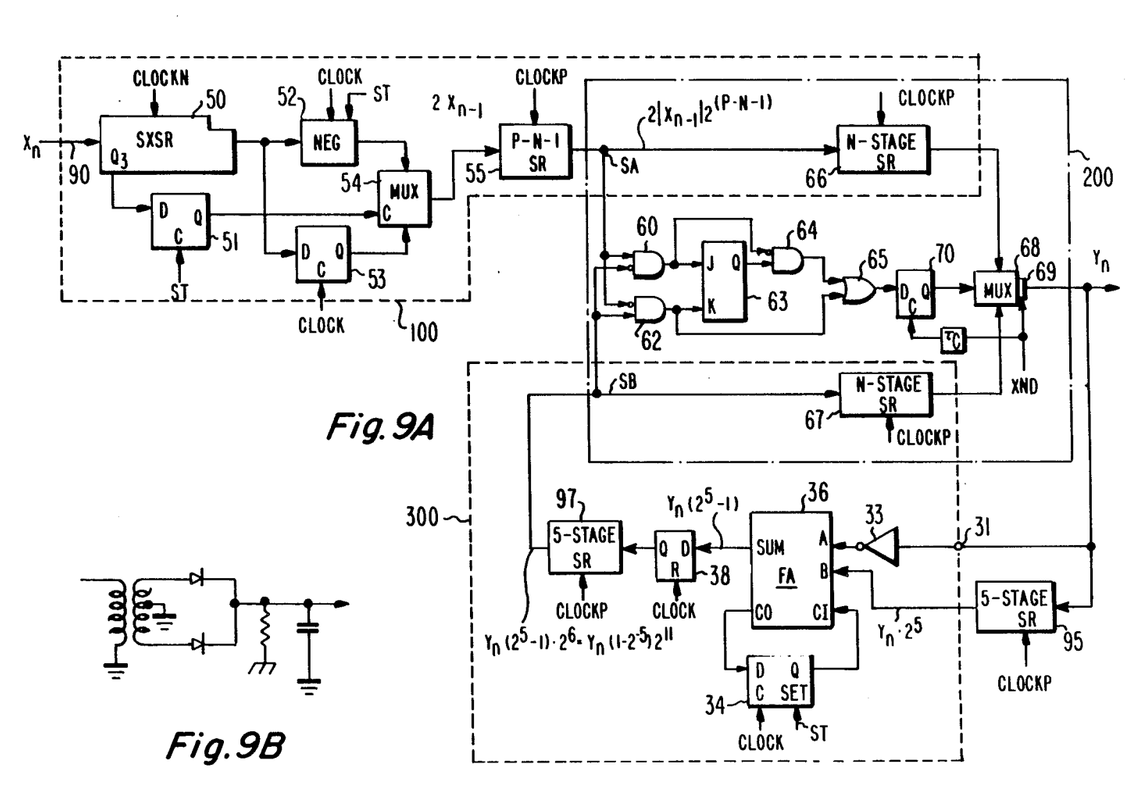
FIG. 9A is a partial schematic, partial block diagram of a serial-bit digital envelope detector utilizing the circuitry illustrated in FIGS. 1 and 3-8.
FIG. 9B is an analog equivalent of the FIG. 9A apparatus.

FIG. 9 is a combination of the aforedescribed ciruits which form a serial-bit digital detector to provide the envelope of a digital representation of an amplitude modulated carrier. In combining the circuits to form the detector, several of the SXSR registers are shared by the respective circuits. For illustrative purposes, assume that the signal input to the FIG. 9 circuit represents a carrier having a frequency of five times the line frequency of a composite NTSC video signal (78.67 KHz) and is modulated by a relatively low frequency signal (less than 20 KHz). Assume also that the signal is a serial-bit two's complement signal occurring at a 300 KHz sample rate. The clock rate is arbitrarily selected to be 10.5 MHz which allows a maximum of 35 clock periods per sample period. Finally, the value of the difference (P−N) between the number of clock pulses of CLOCK P and CLOCK N is chosen to be 11. With the foregoing parameters, the FIG. 9 circuit may be implemented to detect the presence of the secondary audio program signal (SAP) of the standard BSTC sound signal.

The serial-bit envelope detector incorporates an absolute value circuit 100, similar to the circuit shown in FIG. 7, a comparator/maximum value circuit, 200, similar to the circuit shown in FIG. 8 and a subtracter circuit, 300, similar to the circuit of FIG. 5. Elements in FIG. 9 are designated with like numerals as their corresponding counterparts in FIGS. 5, 7 and 8. The output register of the absolute value circuit 100 (56 in FIG. 7) is merged with the comparator register 66. Similarly, the output registers of the subtracter 300 (42 in FIG. 5) is merged with the comparator register 67.

Input samples $X_n$ are applied to terminal 90 of the absolute value circuit 100. The absolute values of the preceding sample $|X_{n-1}|$, multiplied by two due to the one bit processing delay of elements 52, 53, are output by multiplexer 54 and coupled to the (P−N−1) stage register 55. The added delay of register 55 multiplies the samples from multiplexer 54 by $2^{(P-N-1)}$, thus the samples applied to the input, SA, of comparator/maximum value circuit 200 are equal to $|X_{n-1}| \cdot 2^{(P-N)}$. Since (P−N) was defined as 11 the value of the sample available at input, SA, is $|X_{n-1}| 2^{11}$. This sample is coupled to the N-stage register 66 which is clocked by CLOCK P. Clocking a sample into an N-stage register with P clock pulses effects a multiplication by $2^{-(P-N)}$ or $2^{-11}$. The sample output from register 66 corresponds to the sample that precedes the sample coupled to its input by one sample period. This sample having undergone a scaling of $2^{11}$ in register 55 and a scaling of $2^{-11}$ in register 66 is equal to $|X_{n-2}|$.

The output signal $Y_n$ developed by the comparator/maximum value circuit 200 is the greater of the samples applied to the SA and SB input terminals, delayed by one sample period. Samples $Y_n$ are coupled directly to the subtrahend input terminal, 31, of subtracter 300, and to the minuend input terminal via the 5-stage register 95. Register 95 multiplies the $Y_n$ samples applied to the minuend input by $2^5$ relative to the $Y_n$ samples applied to the subtrahend input. The value output by the full adder 36 is $Y_n(2^5-1)$. This value is coupled to the SB input terminal of comparator/maximum value circuit 200 via flip-flop 38 and register 97 which effect a multiplication of the difference sample by $2^6$. The sample coupled to the SB input terminal is $Y_n(2^5-1)\cdot 2^6$ or $Y_n(1-2^{-5})2^{11}$. Comparator 200 therefore effectively compares the values $|X_{n-1}|$ to the values $Y_n(1-2^{-5})$, and outputs the larger. The factor $(1-2^{-5})$ defines the time constant of the envelope detector. To determine the time constant consider a unit step from one to zero. For the last sample before the step, the output $Y_n$ equals the value one. For the first sample output after the step, the output $Y_n$ equals $(1-2^{-5})$, which is the greater of $Y_n(1-2^{-5})$ and zero. For the $n^{th}$ sample output after the step, the output $Y_n$ equal $(1-2^{-5})^n$. The output decays to $\frac{1}{2}$ after $n=21.8\approx 22$ output samples. Each sample period equals 1/3000000 sec. Thus, the time constant of the illustrative circuit is 22/3000000 or approximately 73 μsec.

In the claims the term sign-extend-register is a clocked shift register having a latch coupled in series at the output of the register to selectively pass sample bits output by the register or to hold a particular bit output by the register under the control of a sign extend signal.

What is claimed is:

1. A method of arithmetically processing two's complement serial-bit digital samples, each sample including a sign-bit, and which samples occur in regularly spaced sample intervals, said method comprising:
   arranging the serial bits of each digital sample to occur least significant bit first and sign-bit last;
   providing a plurality of arithmetic processing units to sequentially perform desired arithmetic functions;
   serially interconnecting said arithmetic processing units with sign-extend registers, with an input connection of at least one arithmetic processing unit coupled to an output connection of at least one sign-extend register;
   clocking said sign-extend registers with a burst of a fixed number of pulses per sample period, the duration of said burst being less than the duration of said sample period; and
   applyng a sign-extend control signal to said sign-extend registers to condition said sign-extend registers to replicate the sign-bits of respective samples output by said registers after the occurrence of the respective sign bit within a sample period;
   wherein the respective sign-extend registers include a number of delay stages equal to the fixed number of pulses respectively applied thereto less any processing delay, measured in integral numbers of pulse periods, incurred by samples in an arithmetic processing unit immediately preceding a respective sign-extend register.

2. A method of arithmetically processing serial bit two's complement digital samples having respective sign bits, which samples regularly occur in predetermined sample intervals, the method requiring only two sample clocking signals having respective bursts of pulses during each sample interval, said method comprising:
   clocking said serial-bit digital samples to an arithmetic processing element through a clocked sign-extend register with a first clock signal having a burst of a fixed number of pulses per sample interval, said burst being of duration less than said sample interval which sign-extend register replicates the sign bit of a sample for ones of said first clock pulses occurring after the occurrence of said sign bit;
   serially processing said serial-bit digital samples in said arithmetic processing element;
   applying processed samples from said arithmetic processing element to a further serial register clocked by a second clock signal having a fixed number of pulses per sample interval different from said first clock signal, wherein said further serial register has a number of delay stages equal to said fixed number of pulses of said second clock signal less any processing delay of said processing element measured in an integral number of clock pulse periods.

3. A system for processing serial-bit two's complement digital samples occurring in regularly spaced sample intervals, bits of said serial-bit samples occurring in order of significant from least-significant-bit to sign-bit, said system operating with first and second clock signals providing first and second burst of pulses respectively synchronous with said sample bits, said first burst having a fewer number of pulses than said second burst, and said bursts of pulses occurring each sample interval, said system including:
   means for providing said serial-bit samples;
   means for generating said first and second clock signals;
   means for generating a control signal having first and second states, said control signal conditioned to change from said first state to said second state on the occurrence of a sample sign bit;
   a plurality of serial-bit arithmetic processing elements;
   a plurality of serial-bit shift registers having input, output and clock terminals;
   a plurality of latches having input, output and control terminals, said latches passing sample bits applied to their respective input terminals to their respective output terminals when said control signal applied to their respective control terminals exhibit said first state, and holding the lastmost sample bit applied to their respective input terminals when said control signal changes to said second state;
   means for serially coupling said means for providing serial-bit samples and said plurality of arithmetic processing elements with ones of said serial-bit shift registers and ones of said latches wherein at least one cascade combination of a shift register, a latch and an arithmetic processing element is formed; and
   respective means for coupling said first and second clock signals to respective ones of said shift register clock terminals and for coupling said control signal to the control terminals of said plurality of latches.

4. A system for processing two's complement serial-bit digital samples, which samples occur in regularly spaced sample intervals and may acquire differing bit-widths on being processed in the system, said system comprising:

a clock generator for generating first and second clock signals synchronous with the occurrence of respective bits of said serial-bit digital samples, and a sign-extend control signal having an operative transition at the occurrence of a sign-bit of said serial-bit digital samples, wherein said first and second clock signals provide bursts of pulses initiating simultaneously and terminating within respective sample periods, said second clock signal having a larger number of pulses per burst than said first clock signal;

a sign-extend register having a number of stages equal to the number of pulses in a burst of said first clock signal, said register having an input terminal for applying serial-bit digital samples, an output terminal, a clock terminal for applying said first clock signal and a sign-extend input terminal for aplying said sign-extend signal;

an arithmetic digital signal processing unit having an input terminal coupled to the output terminal of said sign-extend-register and having an output terminal;

a serial register having a signal input terminal coupled to the output terminal of the arithmetic processing unit, a clock input terminal for applying said second clock signal and having a number of stages equal to the number of pulses in a burst of said second clock signal less any processing delay of the arithmetic processing unit measured in integral numbers of clock pulse periods.

5. Apparatus for processing serial-bit two's complement digital signals occurring in equally spaced intervals with all bits of a sample occurring in less than a sample interval, said apparatus comprising:

a serial arithmetic processing unit having an input terminal and an output terminal;

a serial shift register having an input terminal, and output terminal and a clock input terminal;

a sign-extend-register having an input terminal, an output terminal, a clock input terminal and a sign-extend input terminal;

means for serially coupling said serial shift register, said serial arithmetic processing unit and said sign-extend-register in the order recited;

means for generating a first clock signal having a first predetermined number of pulses per sample interval, said predetermined number of pulses occupying an interval of duration less than the duration of said sample interval, a second clock signal having a second predetermined number of pulses per sample interval and a sign-extend signal occurring at the occurrence of a predetermined bit of said serial-bit digital samples; and means for coupling said second clock signal to the clock input terminal of said serial shift register;

means for coupling said first clock signal to said sign-extend-register; and means for coupling said sign-extend signal to said sign-extend input terminal.

6. The apparatus set forth in claim 5 wherein said serial arithmetic processing unit (SAPU) includes a binary adder comprising:

a full adder circuit having a first addend/augend input terminal coupled to the input terminal of said SAPU, a sum output terminal coupled to the output terminal of said SAPU, having a second addend/augend input terminal for applying a serial-bit sample, a carry-in terminal and a carry-out terminal; and a one sample bit delay element coupled between said carry-in and said carry-out terminals.

7. The apparatus set forth in claim 6 further including an inverter interposed between the input terminal of the SAPU and said first addend/augent input terminal; and means to set said delay element to a one state at the beginning of each sample period wherein said full adder provides the difference between serial samples applied to its second and first addend/augend input terminals.

8. The apparatus set forth in claim 5 wherein said serial arithmetic processing unit (SAPU) includes a two's complementing circuit comprising:

an inverter serially coupled to the input terminal of said SAPU;

a half-adder having a first addend/augend input terminal serially coupled to said inverter, a second addend/augend input terminal, a sum output terminal coupled to the output terminal of said SAPU and a carry-out output terminal;

a one sample bit period delay element coupled between said carry-out output terminal and the second addend/augend input terminal; and means for setting said delay element to a one state at the beginning of each sample interval.

9. The apparatus set forth in claim 5 wherein the serial arithmetic processing unit (SAPU) includes a binary multiplier for multiplying serial-bit samples by $2^K$, where K is an integer, said binary multiplier comprising a K-stage shift register coupled between the input and output terminals of said SAPU.

10. The apparatus set forth in claim 5 wherein said serial arithmetic processing unit (SAPU) includes an absolute value circuit and the register coupled to the input terminal of the SAPU includes a tap for providing a sign-bit of said two's complement samples at the beginning of each sample period, said absolute value circuit comprising:

a latch coupled to said tap for storing said sign bit;

switch means having an output terminal coupled to the output terminal of the SAPU, first and second data input terminals, and having a control terminal coupled to said latch, for alternatively applying samples applied to said first and second data input terminals for said sign-bit being a one or zero respectively;

a serial-bit two's complement circuit having an input terminal coupled to the input terminal of the SAPU, and an output terminal coupled to said first data input terminal;

a compensating delay element coupled between the input terminal of said SAPU and the second data input terminal, said compensating delay element providing a delay period equivalent to the processing delay of said two's complement circuit.

11. The apparatus set forth in claim 10 wherein said sign-extend-register coupled to the output terminal of the SAPU is merged into comparing means comprising:

a first input terminal coupled to a predetermined stage of said sign-extend-register, the number of stages between said predetermined stage and the ouput of said register being N in number where N is an integer, and a second input terminal for applying a serial-bit sample to be compared with sample applied to said first input terminal;

an N-stage shift register having an input terminal coupled to said second input terminal, and having an output terminal;

further switch means having first and second data input terminals coupled respectively to the output terminals of said sign-extend-register and said N-stage register, a control input terminal, and an output terminal at which the greater of the samples applied to the first and second input terminals is produced;

means coupled to the first and second input terminals for producing a control signal exhibiting a first output stage if the sample applied to the first input terminal exhibits a logic one in a more significant bit position, excluding sign bits, than the sample applied to the second input terminal, or the sample applied to the first input terminal is positive and the sample applied to the second input terminal is negative, and exhibits a second state otherwise; and a latch for coupling said control signal to said further switch means, wherein said further switch means couples said sign-extend-register or the N-stage register to its output terminal for the control signal exhibiting first and second states respectively.

12. The apparatus set forth in claim 11 wherein said means for producing a control signal comprises:

first and second AND gates having respective non-inverting inputs coupled to said first and second input terminals respectively and having respective inverting inputs coupled to said second and first input terminals respectively and having respective output terminals;

a JK flip-flop having J and K input terminals respectively coupled to the output terminals of said first and second AND gates, respectively and having an output terminal;

a third AND gate having inverting and non-inverting input terminals coupled to the output terminals of said first AND gate and said JK flip-flop respectively, and having an output terminal; and an OR gate having respective input terminals coupled to the output terminals of said third and second AND gates and an output terminal coupled to said latch.

13. Apparatus for processing serial-bit two's complement digital signals occurring in equally spaced intervals with all bits of a sample occurring in less than a sample interval, said apparatus comprising:

a serial arithmetic processing unit having an input terminal and an output terminal;

a serial shift register having an input terminal, an output terminal and a clock input terminal;

a sign-extend-register having an input terminal, an output terminal, a clock input terminal and a sign-extend input terminal;

means for serially coupling said sign-extend-register, said serial arithmetic processing unit and said serial shift register in the order recited;

means for generating a first clock signal having a first predetermined number of pulses per sample interval, said predetermined number of pulses occupying an interval of duration less than the duration of said sample interval, a second clock signal having a second predetermined number of pulses per sample interval and a sign-extend signal occurring at the occurrence of a predetermined bit of said serial-bit digital samples; and means for coupling said second and first clock signals to the clock input terminals of said serial shift register and said sign-extend-register respectively; and means for coupling said sign-extend signal to said sign-extend input terminal.

14. The apparatus set forth in claim 13 wherein said serial arithmetic processing unit (SAPU) includes a binary adder comprising:

a full adder circuit having a first addend/augend input terminal coupled to the input terminal of said SAPU, a sum output terminal coupled to the output terminal of said SAPU, having a second addend/augend input terminal for applying a serial-bit sample, a carry-in terminal and a carry-out terminal; and a one sample bit delay element coupled between said carry-in and said carry-out terminals.

15. The apparatus set forth in claim 14 further including an inverter interposed between the input terminal of the SAPU and said first addend/augend input terminal; and means to set said delay element to a one state at the beginning of each sample period wherein said full adder provides the difference between serial samples applied to its second and first addend/augend input terminals.

16. The apparatus set forth in claim 13 wherein said serial arithmetic processing unit (SAPU) includes a two's complementing circuit comprising:

an inverter serially coupled to the input terminal of said SAPU;

a half-adder having a first addend/augend input terminal serially coupled to said inverter, a second addend/augend input terminal, a sum output terminal coupled to the output terminal of said SAPU and a carry-out output terminal;

a one sample bit period delay element coupled between said carry-out output terminal and the second addend/augend input terminal; and means for setting said delay element to a one state at the beginning of each sample interval.

17. The apparatus set forth in claim 13 wherein the serial arithmetic processing unit (SAPU) includes a binary multiplier for multiplying serial-bit samples by $2^K$, where K is an integer, said binary multiplier comprising a K-stage shift register coupled between the input and output terminals of said SAPU.

18. The apparatus set forth in claim 13 wherein said serial arithmetic processing unit (SAPU) includes an absolute value circuit and the register coupled to the input terminal of the SAPU includes a tap for providing a sign-bit of said two's complement samples at the beginning of each sample period, said absolute value circuit comprising:

a latch coupled to said tap for storing said sign bit;

swtich means having an output terminal coupled to the output terminal of the SAPU, first and second data input terminals, and having a control terminal coupled to said latch, for alternatively applying samples applied to said first and second data input terminals for said sign-bit being a one or zero respectively;

a serial-bit two's complement circuit having an input terminal coupled to the input terminal of the SAPU, and an output terminal coupled to said first data input terminal;

a compensating delay element coupled between the input terminal of said SAPU and the second data input terminal, said compensating delay element providing a delay period equivalent to the processing delay of said two's complement circuit.

19. The apparatus set forth in claim 18 wherein said shift register coupled to the output terminal of the SAPU is merged into comparing means comprising:

a first input terminal coupled to a predetermined stage of said serial shift register, the number of stages between said predetermined stage and the output of said register being N in number where N is an integer, and a second input terminal for applying a serial-bit sample to be compared with samples applied to said first input terminal;

an N-stage shift register having an input terminal coupled to said second input terminal, and having an output terminal;

further switch means having first and second data input terminals coupled respectively to the output terminals of said serial shift register and said N-stage register, a control input terminal, and an output terminal at which the greater of the samples applied to the first and second input terminals is produced;

means coupled to the first and second input terminals for producing a control signal exhibiting a first output state if the sample applied to the first input terminal exhibits a logic one in a more significant bit position, excluding sign bits, than the sample applied to the second input terminal, or the sample applied to the first input terminal is positive and the sample applied to the second input terminal is negative, and exhibits a second state otherwise; and a latch for coupling said control signal to said further switch means, wherein said further switch means couples said serial shift register or the N-stage register to its output terminal for the control signal exhibiting first and second states respectively.

20. The apparatus set forth in claim 19 wherein said means for producing a control signal comprises:

first and second AND gates having respective non-inverting inputs coupled to said first and second input terminals respectively and having respective inverting inputs coupled to said second and first input terminals respectively and having respective output terminals;

a JK flip-flop having J and K input terminals respectively coupled to the output terminals of said first and second AND gates, respectively and having an output terminal;

a third AND gate having inverting and non-inverting input terminals coupled to the output terminals of said first AND gate and said JK flip-flop respectively, and having an output terminal; and an OR gate having respective input terminals coupled to the output terminals of said third and second AND gates and an output terminal coupled to said latch.

* * * * *